United States Patent [15] 3,681,426
Hahn et al. [45] Aug. 1, 1972

[54] FLUORINATED POLYMERS HAVING BISURETHANO SIDE CHAINS

[72] Inventors: Helmut Hahn, Burghausen, Salzach; Siegfried Rebsdat, Altotting; Kasimir Ruchlak, Burgkirchen A12; Erich Schuierer, Burghausen, Salzach, all of Germany

[73] Assignee: Farbwerke Hoechst Aktiengesellschaft vormals Meister Lucius & Brunning, Frankfurt/Main, Germany

[22] Filed: Aug. 15, 1969

[21] Appl. No.: 850,643

[30] Foreign Application Priority Data

Aug. 30, 1968 Germany............P 17 95 261.3

[52] U.S. Cl........................260/471 C, 260/77.5 MA
[51] Int. Cl............................................C07c 125/06
[58] Field of Search..................260/471 C, 77.5 MA

[56] References Cited

UNITED STATES PATENTS 3,428,614  2/1969  Brownstein............260/77.5 BB

Primary Examiner—Lorraine A. Weinberger
Assistant Examiner—L. Arnold Thaxton
Attorney—Connolly and Hutz

[57] ABSTRACT

Polymers of the formula

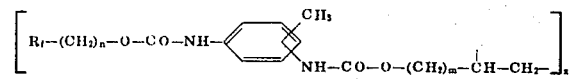

in which $R_f$ is perfluoroalkyl of six to 12 carbon atoms, $n$ is an integer of 1 to 4, $m$ is 0 or 1 and $x$ is a number of about 10 to about 300, are useful as water- and oil-repellent agents for fibrous materials, especially materials consisting of or containing cotton or wool. The agents are used in aqueous dispersions or solutions in organic solvents.

2 Claims, No Drawings

FLUORINATED POLYMERS HAVING BISURETHANO SIDE CHAINS

The present invention relates to polymers of the formula

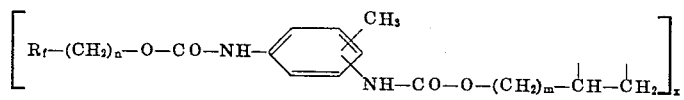

in which $R_f$ represents perfluoroalkyl group of six to 12 carbon atoms, $n$ represents an integer of 1 to 4, $m$ stands for 0 or 1 and $x$ for a number of about 10 to about 300, as well as to a process for the preparation of these polymers and their use for rendering textile materials water- and oil-repellent.

According to French Pat. No. 1,438,617, it is known that compounds of the formula

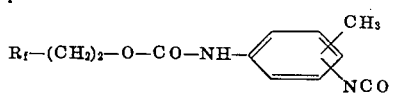

in which $R_f$ stands for a perfluoroalkyl group, are capable of reacting via the —NCO— group with fibers and imparting to them oil- and water-repellent properties. For example, it is possible to achieve an oil-repellence value of 100 on cotton gauze (corresponding to the evaluation according to U.S. Pat. No. 3,362,782, column 4) using a compound of the formula

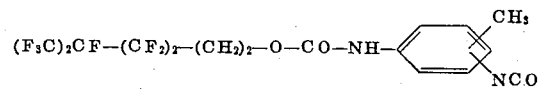

whereas a compound of the formula

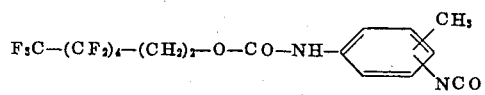

permits an oil-repellence value of 90.

It has now been found that still better oleo- and hydrophobic effects can be obtained using the polymers of the invention.

These polymers of the formula

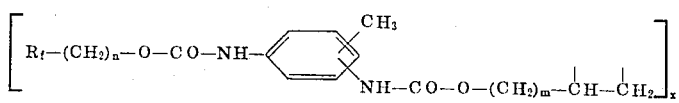

in which $R_f$ represents a perfluoroalkyl group of six to 12 carbon atoms, $n$ represents an integer of 1 to 4, $m$ stands for 0 or 1 and $x$ for a number of about 10 to about 300, can be prepared by reacting a compound of the formula

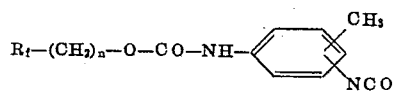

in which $R_f$ and $n$ have the meanings given above, a. with allyl alcohol and polymerizing the bisurethanes thus obtained with a radical-forming catalyst, or
b. with a polyalcohol of the formula $$[HO-(CH_2)_m-CH-CH_2-]_x$$

in which $m$ and $x$ have the meanings given above.

The reaction with the alcohol to yield the bisurethane is preferably carried out at temperatures of from about 20° to about 120° C, especially from about 60° to about 90° C. It is suitable to add catalytic amounts of a tertiary amine, preferably pyridine.

Depending on the catalyst used, the allyl-urethane is polymerized at temperatures of from about 50° to about 150° C, preferably from about 60° to about 100° C.

The fluorinated isocyanate component is easily obtained by reacting the easily obtainable toluene-diisocyanate with fluorinated alcohols of the formula $$R_f-(CH_2)_n-OH$$

in which $R_f$ and $n$ have the meanings given above. The reaction proceeds smoothly already at a temperature below 100° C. The polymerization of the unsaturated fluorinated diurethanes is initiated with the aid of known radicalic catalysts, such as azo-diisobutyric acid and the nitrile thereof, or of peroxides, for example benzoyl peroxide or diisopropylperoxy-dicarbonate.

The polymers obtained from the fluorinated isocyanate and the allyl alcohol are viscous resin-like products. When polyvinyl alcohol or polyallyl alcohol is used as the alcoholic component, dark resin-like products are obtained that are — as the formerly mentioned products — readily soluble in polar organic solvents, such as acetone or dimethylformamide. Such solutions in a concentration of up to at most 1 percent furnish oil-repellence values of 120 to 130 on cotton and wool, and thus are superior to hitherto known products. Their chemical constitution according to the indicated formulas can be established by infrared spectra.

The products of the invention are excellent hydro- and oleophobizing agents for fabrics of any kind. Applied in an amount of only 0.01 percent by weight (calculated on the amount of the fabric to be treated) they already cause an oil-repellent effect; at 0.1 percent by weight, a practically useful repellence of oil can already be observed, and at 0.5 percent by weight the products of the invention permit an oil-repellence value of 110 on wool and on cotton. A surprising property of these products is their fastness to washing: Even after having been washed several times the treated fabrics preserve their oleophobic property.

Whereas the products obtained with the use of polyvinyl alcohol or of commercial polyvinyl alcohol mixtures are almost equally suitable for wool and cotton, the polymer containing the allyl group allows values to be obtained that are by about 10 units higher with regard to their oil-repellence on wool.

The following examples serve to illustrate the inven-

EXAMPLE 1

17.4 grams (0.1 mol) of commercial toluene-diisocyanate (distribution of isomers: about 80 percent of 2,4-toluene diisocyanate and about 20 percent of 2,6-isomer) were added dropwise at 60° C to a solution of 40 g (0.1 mol) of 1,1-dihydro-pentadecafluorooctan-1-ol in 200 ml of dimethylformamide, and stirring of the mixture was continued for 1 hour at 85° C. Subsequently, 5.8 g (0.1 mol) of allyl alcohol in small portions and one drop of pyridine were added to the reaction mixture that had been cooled to 50° C, and then the reaction was allowed to continue for 1 hour, while stirring, at 80° – 85° C. The solvent was evaporated and a yellowish viscous oil of the composition

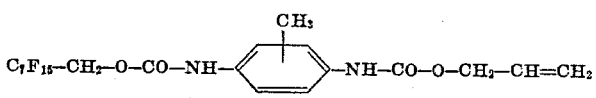

was obtained. 0.1 mol of this allyl compound was polymerized with 0.5 mol-percent of azodiisobutyric acid at 80° C under a nitrogen atmosphere in the course of 6 hours. The viscous resin-like product obtained was readily soluble in acetone and dimethylformamide.

For characterizing the indicated compounds, infrared spectra of solutions in chloroform and of KBr pellets were taken. According to L.J. Bellamy "Ultrarot-Spektrum und chemische Konstitution" (2nd edition, Darmstadt, 1966, page 170), the following bands were to be expected for the present substances to be designated as urethanes:

|  | Amide band I carbonyl absorption (in cm⁻¹) | Amide band II NH deformation (in cm⁻¹) | NH-valence vibration (in cm⁻¹) |
| --- | --- | --- | --- |
| Substances known from literature | 1700 – 1736 | 1600 – 1620 | 3250–3300 |
| urethane polymer | 1710 (KBr) 1740 (CHCl₃) | 1610 (KBr) 1610 (CHCl₃) | 3300 (KBr) 3300 (CHCl₃) |

When an amount 0.5 percent (calculated on textile material) was applied, the oil-repellence values obtained were about 120 on wool and 130 on cotton.

EXAMPLE 2

0.1 mol of toluene-diisocyanate (distribution of isomers as given in Example 1) was added dropwise at about 60° C to a solution of 40 g (0.1 mol) of 1,1-dihydro-pentadecafluorooctan-1-ol in 200 ml of dimethylformamide, and stirring was then continued for another hour at 80° C. 11 grams of a polyvinyl alcohol mixture (medium molecular weight 100,000) were added to the reaction mixture that had cooled to 50° C, and the temperature was raised to 80° C while stirring. The mixture was then allowed to stand for about 15 hours and the solvent was eliminated in vacuo. The solid residue was digested with acetone to remove the unreacted polyvinyl alcohol and then evaporated to dryness. There was obtained a brown viscous product, the 1 percent-solution of which in acetone imparted excellent oil-repellent properties to cotton and wool. In both cases, the oil-repellence index was 120. The infrared spectrum of the polymer (taken in substance) showed the following bands:

Amide band I 1,720 cm⁻¹
Amide band II 1,600 cm⁻¹
NH-valence vibration 3,290 cm⁻¹.

We claim:

1. A polymer consisting essentially of recurring units of the formula

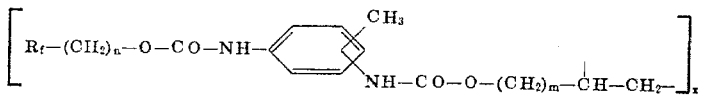

in which $R_f$ is perfluoroalkyl of six to 12 carbon atoms, $n$ is an integer of 1 to 4, $m$ is 0 or 1 and $x$ is a number of about 10 to about 300.

2. The polymer as claimed in claim 1, wherein $R_f$ stands for perfluoro-n-alkyl of six to 12 carbon atoms.

* * * * *